United States Patent
Chang et al.

(10) Patent No.: US 9,851,610 B2
(45) Date of Patent: Dec. 26, 2017

(54) PIXEL STRUCTURE AND LIQUID CRYSTAL DISPLAY INCLUDING THE SAME

(71) Applicant: Au Optronics Corporation, Hsinchu (TW)

(72) Inventors: Che-Chia Chang, Taichung (TW); Pei-Chun Liao, Hsinchu County (TW); Yu-Ling Yeh, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 20 days.

(21) Appl. No.: 15/011,657

(22) Filed: Jan. 31, 2016

(65) Prior Publication Data

US 2016/0291423 A1    Oct. 6, 2016

(30) Foreign Application Priority Data

Mar. 31, 2015  (TW) .............................. 104110496 A (51) Int. Cl.
*G02F 1/1337*  (2006.01)
*G02F 1/1343*  (2006.01)

(52) U.S. Cl.
CPC .. *G02F 1/134363* (2013.01); *G02F 1/133707* (2013.01)

(58) Field of Classification Search
CPC .......................... G02F 1/134309; G02F 1/1368
See application file for complete search history.

(56) References Cited

U.S. PATENT DOCUMENTS

| 8,212,954 | B2 | 7/2012 | Yata |
| 8,279,382 | B2 | 10/2012 | Nishida |
| 2007/0002245 | A1* | 1/2007 | Lee ................... G02F 1/134363 349/141 |
| 2007/0153202 | A1* | 7/2007 | Kang .................. G02F 1/13439 349/141 |
| 2008/0198318 | A1* | 8/2008 | Lee ................... G02F 1/134363 349/141 |
| 2009/0128727 | A1* | 5/2009 | Yata .................. G02F 1/134363 349/46 |
| 2009/0262287 | A1 | 10/2009 | Nishida |
| 2010/0157228 | A1* | 6/2010 | Sakurai ................. G02F 1/1337 349/141 |

(Continued)

FOREIGN PATENT DOCUMENTS

| CN | 101495910 | 7/2009 |
| CN | 103792738 | 5/2014 |

*Primary Examiner* — Sang V Nguyen
(74) *Attorney, Agent, or Firm* — JCIPRNET (57) ABSTRACT

A pixel structure is provided and disposed in a pixel region divided up by a dummy line. The pixel structure includes a pixel electrode. The pixel electrode includes first branches and second branches located at opposite sides and disposed symmetrically with respect to the dummy line. One first branch has an extending portion and an end portion. A direction is directing from a front end toward a terminal end of the extension portion, and the terminal end of the extension portion is connected to a front end of the end portion. A bending direction is directing from the front end to a terminal end of the end portion. The direction is toward the dummy line and the bending direction is parallel to or away from the dummy line, or the direction is away from the dummy line and the bending direction is parallel to or toward the dummy line.

14 Claims, 9 Drawing Sheets

(56) References Cited

U.S. PATENT DOCUMENTS

| | | | | |
|---|---|---|---|---|
| 2011/0170027 A1* | 7/2011 | Nakanishi | ......... | G02F 1/133707 349/33 |
| 2014/0192308 A1* | 7/2014 | Furukawa | ......... | G02F 1/136209 349/138 |
| 2014/0293175 A1* | 10/2014 | Tamaki | ............. | G02F 1/134363 349/33 |
| 2014/0293177 A1* | 10/2014 | Matsushima | ..... | G02F 1/134363 349/33 |
| 2014/0354931 A1* | 12/2014 | Kurasawa | ......... | G02F 1/134336 349/124 |
| 2015/0378220 A1* | 12/2015 | Cao | ................... | G02F 1/134309 349/123 |
| 2016/0202577 A1* | 7/2016 | Jung | ................ | G02F 1/134363 349/144 |

* cited by examiner

PIXEL STRUCTURE AND LIQUID CRYSTAL DISPLAY INCLUDING THE SAME

CROSS-REFERENCE TO RELATED APPLICATION

This application claims the priority benefit of Taiwan application serial no. 104110496, filed on Mar. 31, 2015. The entirety of the above-mentioned patent application is hereby incorporated by reference herein and made a part of this specification.

BACKGROUND OF THE INVENTION

1. Field of the Invention

The invention relates to a pixel structure and a display including the pixel structure, and particularly relates to a pixel structure capable of reducing disclination lines and a liquid crystal display including the pixel structure.

2. Description of Related Art

As the specification of liquid crystal displays is being developed toward a larger size, the market is demanding that the liquid crystal displays have a high contrast, a rapid response, and a wide viewing angle, etc. To overcome the issue of viewing angle of the large-sized liquid crystal displays, the technique of wide viewing angle must keep on advancing and developing. Currently, the common techniques of wide viewing angle include: TN liquid crystal display complying with wide viewing film, in-plane switching (IPS) liquid crystal display, fringe field switching (FFS) liquid crystal display, and multi-domain vertical alignment (MVA) liquid crystal display, etc.

Taking the IPS liquid crystal display as an example, the IPS liquid crystal display has the characteristics of wide viewing angle, low color shift, and high saturation, etc. However, in the conventional IPS liquid crystal display, since the liquid crystal molecules above the pixel electrode and above the alignment slit between the branches of the pixel electrode perceive different magnitude of electrical field, they tilt along different directions, thus creating unexpected disclination lines and making the liquid crystal efficiency decreased. Thus, how to develop a pixel structure having a higher transmittance and suppressing disclination lines should be an issue for the relevant researchers to work on.

SUMMARY OF THE INVENTION

The invention provides a pixel structure capable of reducing disclination lines.

The invention provides a liquid crystal display having a preferable liquid crystal efficiency.

The pixel structure of the invention is disposed in a pixel region. A dummy line divides up the pixel region. The pixel structure includes an active device and a pixel electrode. A pixel electrode includes a plurality of first branches and a plurality of second branches. The first branches and the second branches are respectively located at opposite sides with respect to the dummy line and disposed symmetrically with respect to the dummy line. At least one of the first branches has a first extension portion and a first end portion. A direction directing from a front end toward a terminal end of the first extension portion is a first direction. The terminal end of the first extension portion is connected to a front end of the first end portion, and a direction directing from the front end to a terminal end of the first end portion is a first bending direction. In addition, the first direction is toward the dummy line and the first bending direction is parallel to or away from the dummy line, or the first direction is away from the dummy line and the first bending direction is parallel to or toward the dummy line.

A liquid crystal display of the invention includes a pixel array layer, a color filter, a liquid crystal layer, and an alignment layer. The pixel array layer includes a plurality of the pixel structures. The liquid crystal layer is disposed between the pixel array layer and the color filter layer. The alignment layer is disposed between the pixel array layer and the liquid crystal layer and has an alignment direction. In addition, the first direction is not parallel to the alignment direction.

According to an embodiment of the invention, the dummy line is a horizontal line, and the dummy line divides the pixel region into an upper part and a lower part.

According to an embodiment of the invention, at least one of the second branches has a second extension portion and a second end portion. A direction directing from a front end toward a terminal end of the second extension portion is a second direction. The terminal portion of the second extension portion is connected to a front end of the second end portion. A direction directing from the front end toward a terminal end of the second end portion is a second bending direction. In addition, the at least one second branch and the at least one first branch are disposed symmetrically with respect to the dummy line.

According to an embodiment of the invention, the pixel electrode further includes a first trunk located at a first side of the pixel region. In addition, the front end of the first extension portion is physically connected to the first trunk through a first connection point, and the first extension portion extends to the terminal end from the first connection point without being bent.

According to an embodiment of the invention, the front end of the second extension portion is physically connected to the first trunk through a second connection point, and the second extension portion extends to the terminal end from the second connection point without being bent.

According to an embodiment of the invention, a portion where the front end of the first extension portion and the first trunk are physically connected is substantially in a triangular shape.

According to an embodiment of the invention, a common electrode is further included. In addition, the common electrode includes a plurality of third branches and a plurality of fourth branches, the third branches and the first branches are located at the same side with respect to the dummy line and are disposed alternately, and the fourth branches and the second branches are located at the same side with respect to the dummy line and are disposed alternately.

According to an embodiment of the invention, at least one of the third branches has a third extension portion and a third end portion. A direction directing from a front end toward a terminal end of the third extension portion is a third direction. The terminal end of the third extension portion is connected to a front end of the third end portion. A direction directing from the front end toward a terminal end of the third end portion is a third bending direction. In addition, the third direction is parallel and opposite to the first direction, and the third bending direction is parallel and opposite to the first bending direction.

According to an embodiment of the invention, the first branches and the third branches are located at the upper part of the pixel region, the first end portion is bent downward from the first direction, the third end portion is bent upward from the third direction, or the first branches and the third branches are located at the lower part of the pixel region, the first end portion is bent upward from the first direction, and the third end portion is bent downward from the third direction.

According to an embodiment of the invention, at least one of the fourth branches has a fourth extension portion and a fourth end portion. A direction directing from a front end toward a terminal end of the fourth extension portion is a fourth direction. The terminal end of the fourth extension portion is connected to a front end of the fourth end portion. A direction directing from the front end toward a terminal end of the fourth end portion is a fourth bending direction. In addition, the fourth direction is parallel and opposite to the second direction, and the fourth bending direction is parallel and opposite to the second bending direction.

According to an embodiment of the invention, the second branches and the fourth branches are located at the lower part of the pixel region, the second end portion is bent upward from the second direction, and the fourth end portion is bent downward from the fourth direction, or the second branches and the fourth branches are located at the upper part of the pixel region, the second end portion is bent downward from the second direction, and the fourth end portion is bent upward from the fourth direction.

According to an embodiment of the invention, the common electrode includes a second trunk located at a second side of the pixel region. In addition, the front end of the third extension portion is physically connected to the second trunk through a third connection point, and the third extension portion extends to the terminal end from the third connection point without being bent. Moreover, the first side and the second side are opposite sides.

According to an embodiment of the invention, the front end of the fourth extension portion is physically connected to the second trunk through a fourth connection point, and the fourth extension portion extends to the terminal end from the fourth connection point without being bent.

According to above, in the pixel structure of the invention, the directions respectively defined with the end portions and the extension portions of the branches are related to the dummy line in a specific way, so as to reduce disclination lines. In this way, the liquid crystal efficiency may be increased, such that the liquid crystal display using the pixel structure has a preferable transmittance and display quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
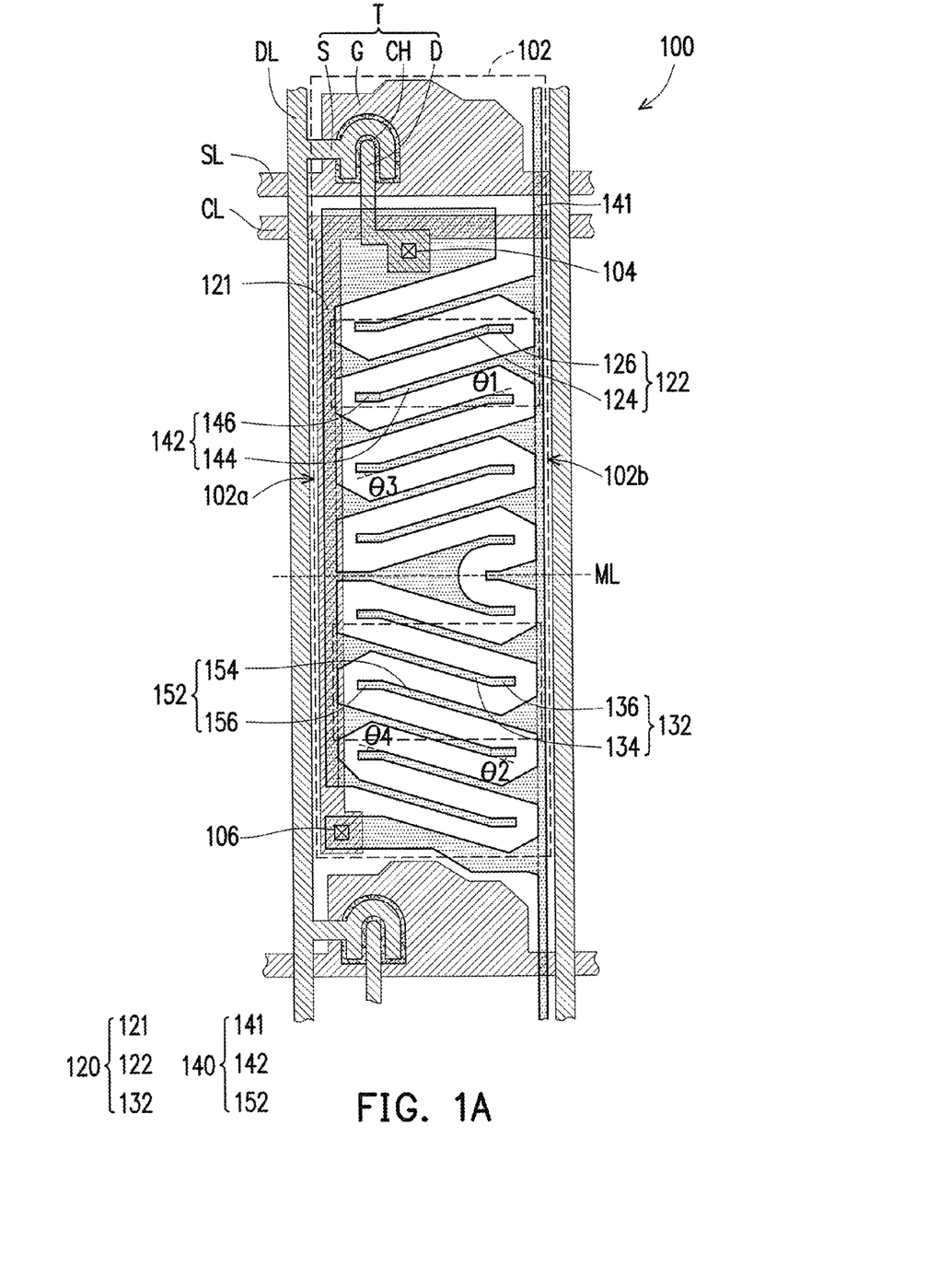
FIG. 1A is a schematic top view illustrating a pixel structure according to an embodiment of the invention.
Figure 1B:
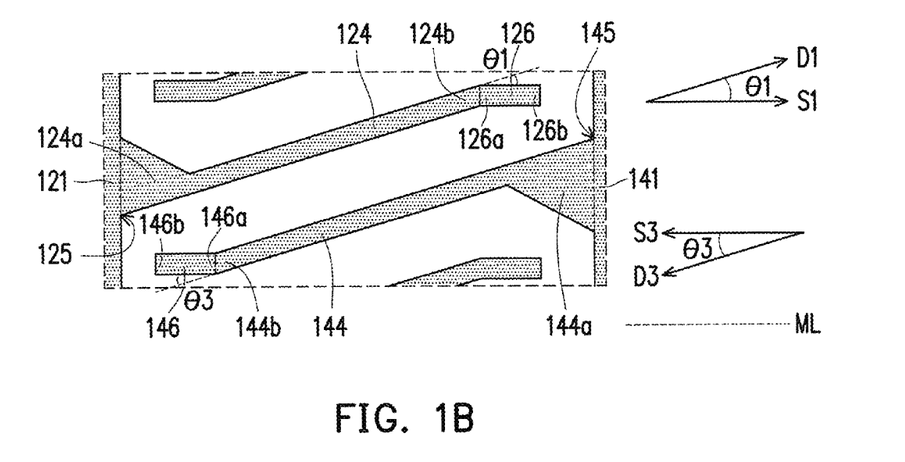
FIG. 1B is a schematic partially enlarged view of FIG. 1A.
Figure 1C:
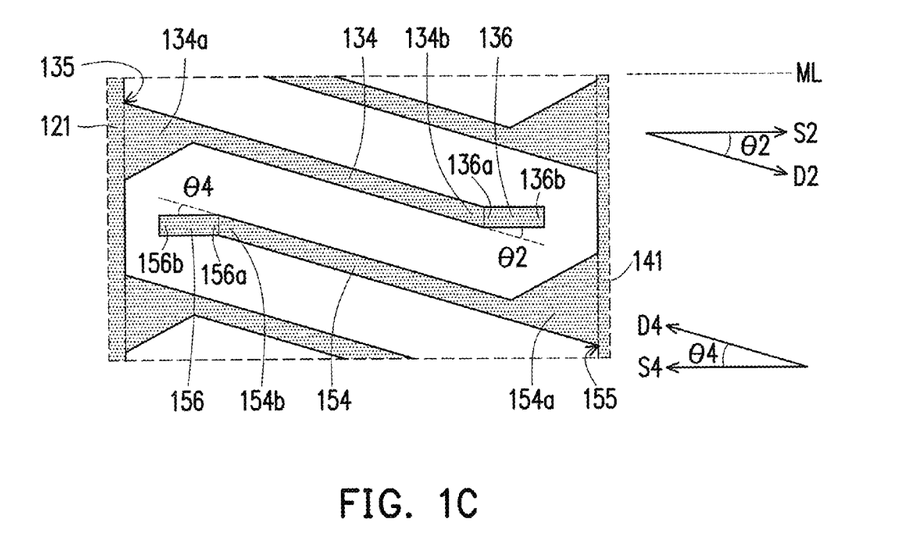
FIG. 1C is a schematic partially enlarged view of FIG. 1A.

FIG. 1A is a schematic top view illustrating a pixel structure according to an embodiment of the invention, and FIGS. 1B and 1C are respectively schematic partially enlarged views of FIG. 1A. At the right parts of FIGS. 1B and 1C, a relation between a directionality and a dummy line is illustrated. Referring to FIG. 1A, a pixel structure 100 is disposed in a pixel region 102. The pixel region 102 is divided into an upper part and a lower part by a dummy line ML. The pixel structure 100 includes an active device T, a pixel electrode 120, and a common electrode 140. The pixel structure 100 is electrically connected to a data line DL through the active device T. A scan line SL intersects the data line DL to define the pixel region 102. In this embodiment, extending directions of the scan line SL and the data line DL are perpendicular to each other, for example. In addition, an insulating layer (not shown) is disposed between the scan line SL and the data line DL. In this embodiment, the pixel structure 100 further includes a common line CL, and the common line CL is partially overlapped with the pixel electrode 120, for example.

The scan line SL and the data line DL mainly serve to transmit a driving signal that drives the pixel structure 100. In general, the scan line SL and the data line DL are formed of a metallic material. However, the invention is not limited thereto. According to other embodiments, the scan line SL and the data line DL may also be formed of other conductive materials, such as alloys, oxides of metallic materials, nitrides of metallic materials, oxynitrides of metallic materials, or a stack layer of metallic materials and other conductive materials.

The active device T is electrically connected to the scan line SL and the data line DL. Here, the active device T is a thin film transistor, for example, and includes a gate G, a channel layer CH, a drain D, and a source S. The gate G is electrically connected to the scan line SL, and the source S is electrically connected to the data line DL. In other words, when a control signal is input to the scan line SL, the scan line SL and the gate G are electrically conductive. When the control signal is input to the data line DL, the data line DL and the source S are electrically conductive. The channel layer CH is located above the gate G and below the source S and the drain D. The active device T of this embodiment is a bottom-gate thin film transistor, for example. However, the invention is not limited thereto. In other embodiments, the active device T may also be a top-gate thin film transistor.

The gate G of the active device T may be further covered by an insulating layer (not shown), and the insulating layer may also be referred to as a gate insulating layer. Besides, the active device may also be covered by another insulating layer, and the insulating layer may be referred to as a passivation layer. A material of the gate insulating layer and the passivation layer is an inorganic material, an organic material, or a combination thereof, for example. The inorganic material includes silicon oxide, silicon nitride, silicon oxynitride, or a stack layer of at least two of the aforesaid materials, for example.

The pixel electrode 120 is a transparent conductive layer, including a metal oxide, such as indium tin oxide, indium zinc oxide, aluminum tin oxide, aluminum zinc oxide, indium germanium zinc oxide, other suitable oxides, or a stack layer of at least two of the aforesaid materials. The pixel electrode 120 is electrically connected to the active device T. Namely, the pixel electrode 120 may be electrically connected to the drain D of the active device T through a contact 104. Here, the contact 104 penetrates the insulating layer. A material of the common electrode 140 is the same as the material of the pixel electrode 120, for example. The common electrode 140 is electrically connected to the common line CL through a contact 106, for example. In other words, a voltage level of the common electrode 140 is equivalent to a voltage level of the common line CL.

Referring to FIGS. 1A and 1B together, the pixel electrode 120 includes a first trunk 121, a plurality of first branches 122, and a plurality of second branches 132. The first branches 122 and the second branches 132 are respectively located at opposite sides with respect to the dummy line ML and are disposed symmetrically with respect to the dummy line ML. The first trunk 121 is located at a first side 102a of the pixel region 102, and the first trunk 121 extends vertically along a side of the pixel region 102, for example. Each of the first branches 122 is connected to the first trunk 121 and extends from the first trunk 121 toward the inside of the pixel region 102. Specifically, the first branch 122 has a first extension portion 124 and a first end portion 126, and the first extension portion 124 has a front end 124a and a terminal end 124b. In addition, the front end 124a is an end close to the first trunk 121, and the terminal end 124b is an end close to the first end portion 126. In this embodiment, the front end 124a of the first extension portion 124 is physically connected to the first trunk 121 through a first connection point 125, for example, and the first extension portion 124 extends to the terminal end 124b from the first connection point 125 without being bent, for example. In other words, the first extension portion 124 substantially linearly extends to the terminal end 124b from the first connection point 125, for example. Moreover, in this embodiment, a portion where the front end 124a of the first extension portion 124 and the first trunk 121 are physically connected is in a triangular shape, for example, or other shapes. In other words, in the first extension portion 124, the invention does not limit an overall shape of the front end 124a of the first extension portion 124 as long as at least a portion of the front end 124a linearly extends to the terminal end 124b.

The terminal end 124b of the first extension portion 124 is connected to a front end 126a of the first end portion 126. A direction directing from the front end 124a toward the terminal end 124b of the first extension portion 124 is defined as, a directional direction, a first direction D1. A direction directing from the front end 126a toward the terminal end 126b of the first end portion 126 is defined as, a directional direction, a first bending direction S1. In this embodiment, the first direction D1 is away from the dummy line ML, for example, and the first bending direction S1 is parallel to or toward the dummy line ML, for example. In other words, taking the first branch 122 located at the upper part of the pixel region 102 as an example, the first end portion 126 is bent downward from the first direction D1. In this embodiment, an angle θ1 is 15 degrees, for example. A length of the first end portion 126 is 8.75 μm, for example, or other suitable values.

The common electrode 140 includes a second trunk 141, a plurality of third branches 142, and a plurality of fourth branches 152. The second branches 141 are located at a second side 102b and extend vertically along a side of the pixel region 102, for example. In other words, the first branch 121 and the second branch 141 are located at opposite sides of the pixel region 102, for example. The third branches 142 and the first branches 122 are located at the same side with respect to the dummy line ML and are alternately disposed, and the fourth branches 152 and the second branches 132 are located at the same side with respect to the dummy line ML and are alternately disposed. Each of the third branches 142 is connected to the second trunk 141 and extends from the second trunk 141 toward the inside of the pixel region 102. Specifically, the third branch 142 has a third extension portion 144 and a third end portion 146, and the third extension portion 144 has a front end 144a and a terminal end 144b. In addition, the front end 144a is an end close to the second trunk 141, and the terminal end 144b is an end close to the third end portion 146. In this embodiment, the front end 144a of the third extension portion 144 is physically connected to the second trunk 141 through a third connection point 145, for example, and the third extension portion 144 extends to the terminal end 144b from the third connection point 145 without being bent, for example. In other words, the third extension portion 144 substantially linearly extends to the terminal end 144b from the third connection point 145, for example. Moreover, in this embodiment, a portion where the front end 144a of the third extension portion 144 and the second trunk 141 are physically connected is in a triangular shape, for example, or other shapes. In other words, in the third extension portion 144, the invention does not limit an overall shape of the front end 144a of the third extension portion 144 as long as at least a portion of the front end 144a linearly extends to the terminal end 144b.

The terminal end 144b of the third extension portion 144 is connected to a front end 146a of the third end portion 146. A direction directing from the front end 144a toward the terminal end 144b of the third extension portion 144 is defined as, a directional direction, a third direction D3. A direction directing from the front end 146a toward the terminal end 146b of the third end portion 146 is defined as, a directional direction, a third bending direction S3. In addition, the third direction D3 is parallel and opposite to the first direction D1, and the third bending direction S3 is parallel and opposite to the first bending direction S1. Thus, the first direction D1 and the third direction D3 substantially differ in 180 degrees, and the third bending direction S3 and the first bending direction S1 substantially differ in 180 degrees. In this embodiment, the third direction D3 is toward the dummy line ML, for example, and the third bending direction S3 is parallel to or away from the dummy line ML, for example.

In other words, taking the third branch 142 located at the upper part of the pixel region 102 as an example, the third end portion 146 is bent upward from the third direction D3. In this embodiment, an angle θ3 is 15 degrees, for example. A length of the third end portion 146 is 8.75 µm, for example, or other suitable values.

In this embodiment, the first branches 122 of the pixel electrode 120 and the third branches 142 of the common electrode 140 are alternately disposed, and slits are formed between the first and third branches 122 and 142. An extending direction of the first branches 122 and an extending direction of the third branches 142 are parallel to each other, for example. Thus, the slits between the first and third branches 122 and 142 are also parallel to each other. In other words, an extending direction of the slits (i.e., a slit direction) is parallel to the first direction D1 and the third direction D3. The first extension portions 124 and the third extension portions 144 are substantially disposed alternately and parallel with respect to each other. In this embodiment, the adjacent first and third branches 122 and 142 are disposed symmetrically, for example.

Referring to FIGS. 1A and 1C, each of the second branches 132 is connected to the first trunk 121 and extends from the first trunk 121 toward the inside of the pixel region 102. Specifically, the second branch 132 has a second extension portion 134 and a second end portion 136, and the second extension portion 134 has a front end 134a and a terminal end 134b. In addition, the front end 134a is an end close to the first trunk 121, and the terminal end 134b is an end close to the second end portion 136. In this embodiment, the front end 134a of the second extension portion 134 is physically connected to the first trunk 121 through a second connection point 135, for example, and the second extension portion 134 extends to the terminal end 134b from the second connection point 135 without being bent, for example. In other words, the second extension portion 134 substantially linearly extends to the terminal end 134b from the second connection point 135, for example. Moreover, in this embodiment, a portion where the front end 134a of the second extension portion 134 and the first trunk 121 are physically connected is in a triangular shape, for example, or other shapes. In other words, in the second extension portion 134, the invention does not limit an overall shape of the front end 134a of the second extension portion 134 as long as at least a portion of the front end 134a linearly extends to the terminal end 134b.

The terminal end 134b of the second extension portion 134 is connected to a front end 136a of the second end portion 136. A direction directing from the front end 134a toward the terminal end 134b of the second extension portion 134 is defined as, a directional direction, a directional second direction D2. A direction directing from the front end 136a toward the terminal end 136b of the second end portion 136 is defined as, a directional direction, a second bending direction S2. At least one second branch 132 and at least one first branch 122 are disposed symmetrically with respect to the dummy line ML. In this embodiment, the second direction D2 is away from the dummy line ML, for example, and the second bending direction S2 is parallel to or toward the dummy line ML, for example. In other words, taking the second branch 132 located at the lower part of the pixel region 102 as an example, the second end portion 136 is bent upward from the second direction D2. In this embodiment, an angle θ2 is 15 degrees, for example. A length of the second end portion 136 is 8.75 µm, for example, or other suitable values.

In this embodiment, the common electrode 140 further includes a plurality of fourth branches 152, for example. Each of the fourth branches 152 is connected to the second trunk 141 and extends from the second trunk 141 toward the inside of the pixel region 102. Specifically, the fourth branch 152 has a fourth extension portion 154 and a fourth end portion 156, and the fourth extension portion 154 has a front end 154a and a terminal end 154b. In addition, the front end 154a is an end close to the second trunk 141, and the terminal end 154b is an end close to the fourth end portion 156. In this embodiment, the front end 154a of the fourth extension portion 154 is physically connected to the second trunk 141 through a fourth connection point 155, for example, and the fourth extension portion 154 extends to the terminal end 154b from the fourth connection point 155 without being bent, for example. In other words, the fourth extension portion 154 substantially linearly extends to the terminal end 154b from the fourth connection point 155, for example. Moreover, in this embodiment, a portion where the front end 154a of the fourth extension portion 154 and the second trunk 141 are physically connected is in a triangular shape, for example, or other shapes. In other words, in the fourth extension portion 154, the invention does not limit an overall shape of the front end 154a of the fourth extension portion 154 as long as at least a portion of the front end 154a linearly extends to the terminal end 154b.

The terminal end 154b of the fourth extension portion 154 is connected to the fourth end portion 156. A direction directing from the front end 154a toward the terminal end 154b of the fourth extension portion 154 is defined as, a directional direction, a fourth direction D4. A direction directing from the front end 156a toward the terminal end 156b of the fourth end portion 156 is defined as, a directional direction, a fourth bending direction S4. In addition, the fourth direction D4 is parallel and opposite to the second direction D2, and the fourth bending direction S4 is parallel and opposite to the second bending direction S2. Thus, the second direction D2 and the fourth direction D4 substantially differ in 180 degrees, and the fourth bending direction S4 and the second bending direction S2 substantially differ in 180 degrees. In this embodiment, the fourth direction D4 is toward the dummy line ML, for example, and the fourth bending direction S4 is parallel to or away from the dummy line ML, for example. In other words, taking the fourth branch 152 located at the lower part of the pixel region 102 as an example, the fourth end portion 156 is bent downward from the fourth direction D4. In this embodiment, an angle θ4 is 15 degrees, for example. A length of the fourth end portion 156 is 8.75 µm, for example, or other suitable values.

In this embodiment, the second branches 132 of the pixel electrode 120 and the fourth branches 152 of the common electrode 140 are alternately disposed, and slits are formed between the second and fourth branches 132 and 152. An extending direction of the second branches 132 and an extending direction of the fourth branches 152 are parallel to each other, for example. Thus, the slits between the second and fourth branches 132 and 152 are also parallel to each other. In other words, an extending direction of the slits (i.e., a slit direction) is parallel to the second direction D2 and the fourth direction D4. The second extension portions 134 and the fourth extension portions 154 are substantially disposed alternately and parallel with respect to each other. In this embodiment, the adjacent second and fourth branches 132 and 152 are disposed symmetrically, for example.

It should be noted that a configuration at a position where the first branch 122, the second branch 132, and the first trunk 121 are connected at a boundary between the upper part and the lower part of the pixel electrode 120 is slightly different from a configuration of other first branches 122 and the second branches 132. However, the configuration still possesses the feature that the first direction D1 is away from the dummy line ML, for example, the first bending direction S1 is parallel to or toward the dummy line ML, for example, the second direction D2 is away from the dummy line ML, for example, and the second bending direction S2 is parallel to or toward the dummy line ML, for example. Moreover, even though it is described in the embodiment that all the branches meet the above feature, the invention is not limited thereto. In other words, it is not departed from the spirit of the invention as long as at least one branch possesses the feature.

Figure 2A:
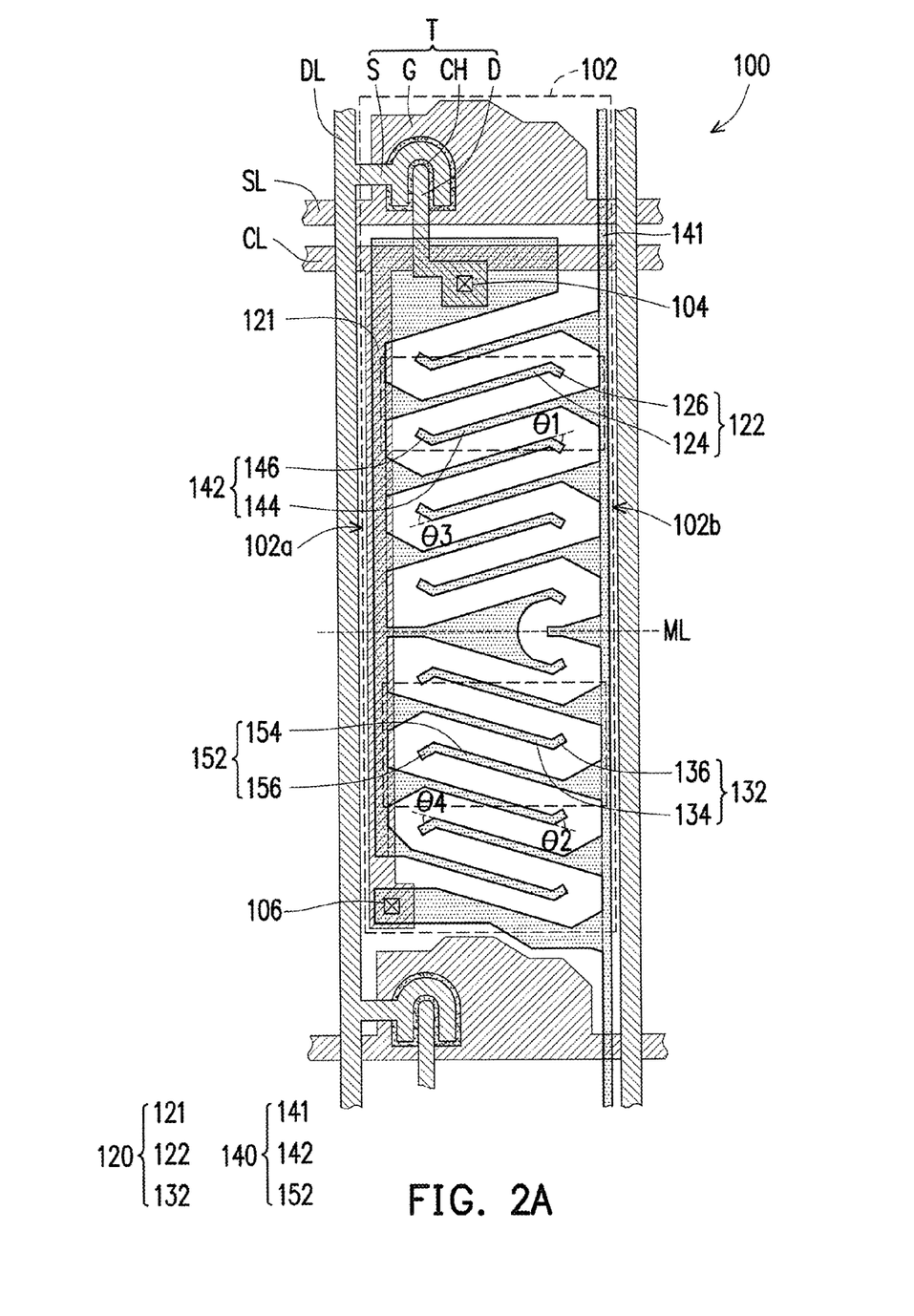
FIG. 2A is a schematic top view illustrating a pixel structure according to an embodiment of the invention.
Figure 2B:
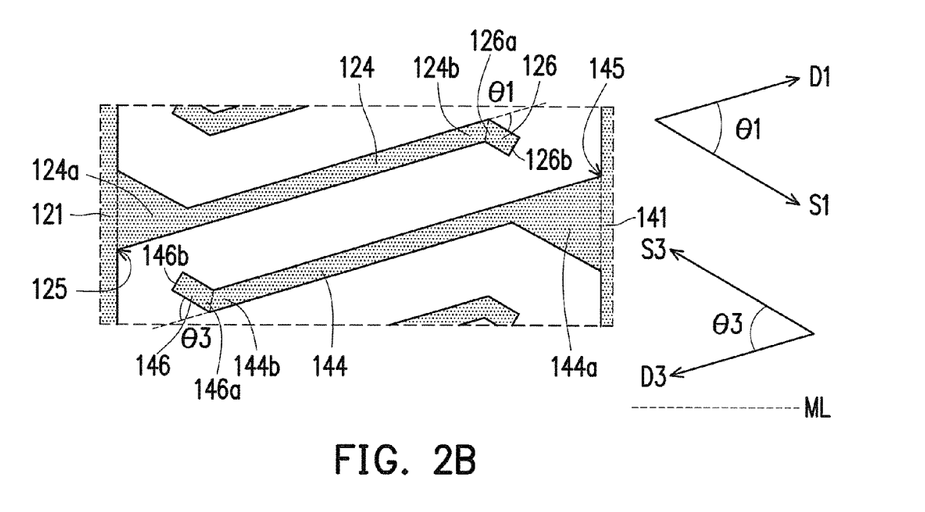
FIG. 2B is a schematic partially enlarged view of FIG. 2A.
Figure 2C:
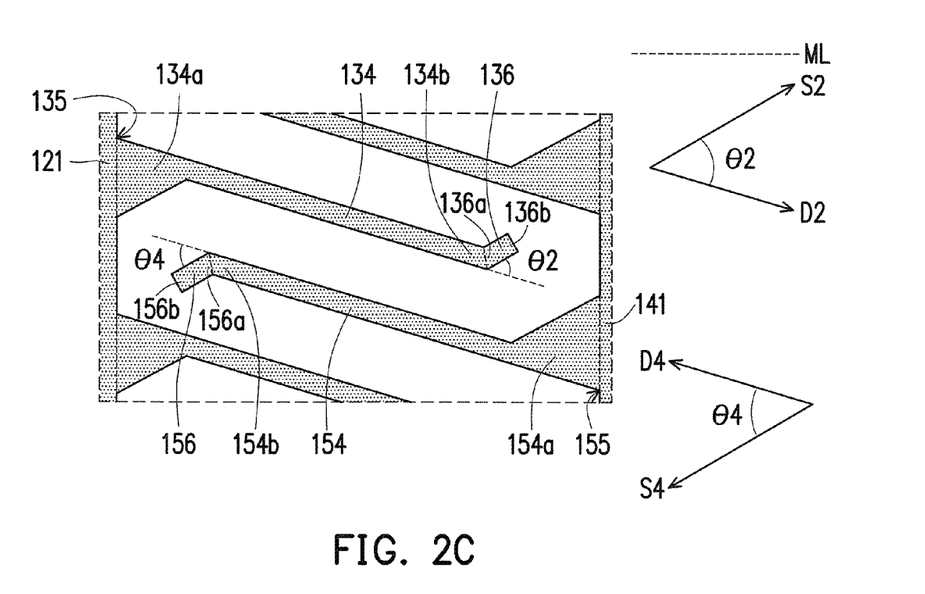
FIG. 2C is a schematic partially enlarged view of FIG. 2A.
Figure 3A:
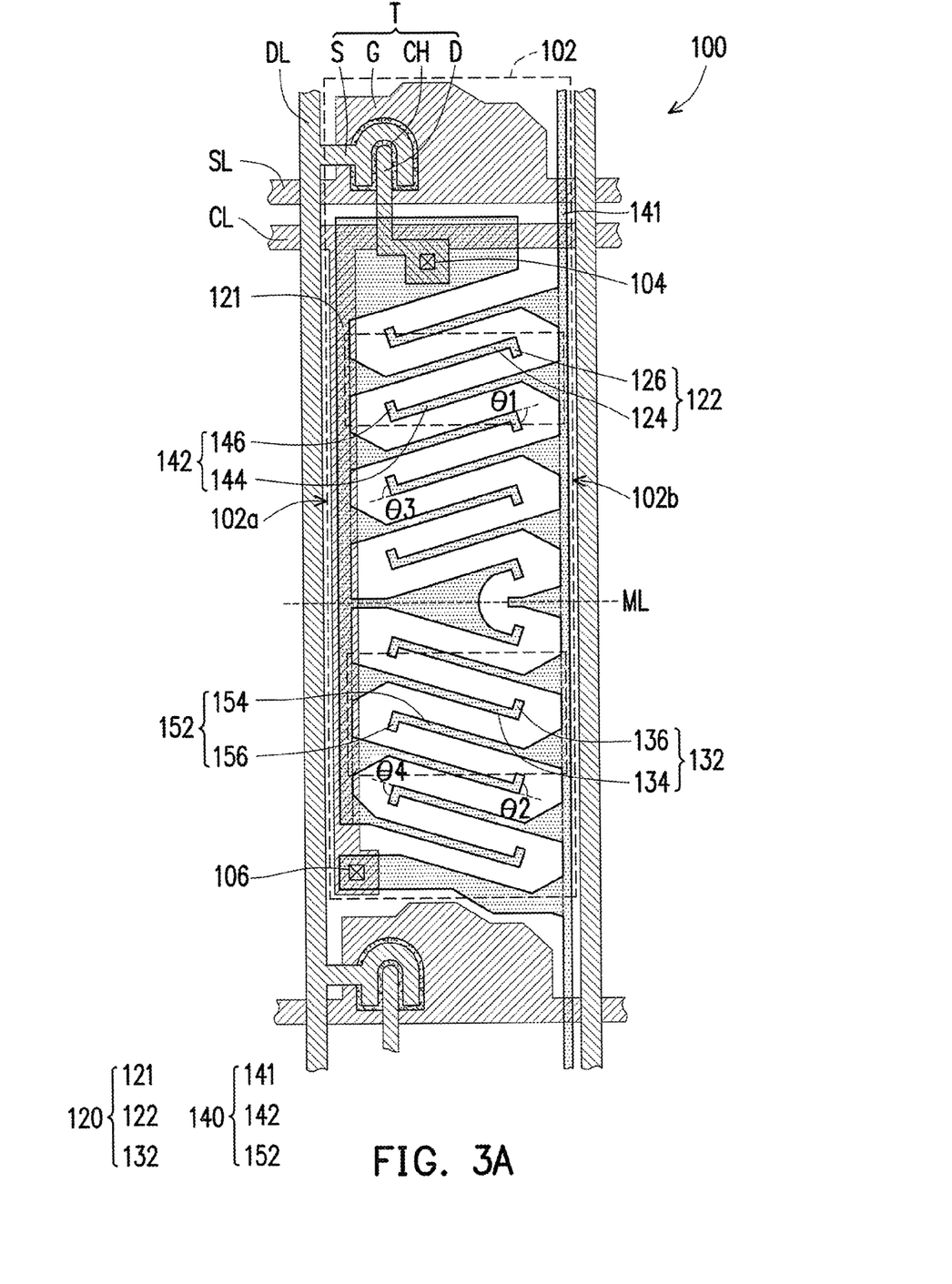
FIG. 3A is a schematic top view illustrating a pixel structure according to an embodiment of the invention.
Figure 3B:
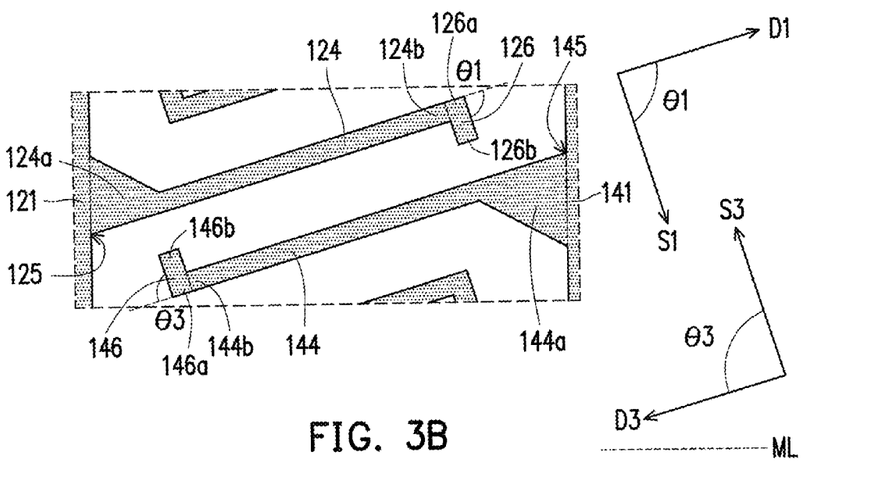
FIG. 3B is a schematic partially enlarged view of FIG. 3A.
Figure 3C:
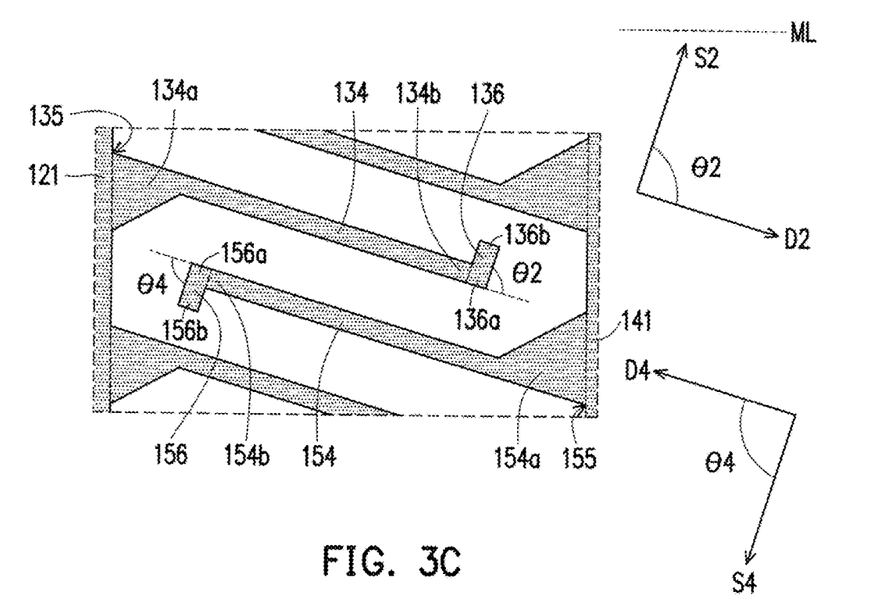
FIG. 3C is a schematic partially enlarged view of FIG. 3A.

In this embodiment, the angle θ1 between the first bending direction S1 and the first direction D1 is described to be approximately 15 degrees, for example. However, the invention is not limited thereto. The angle θ1 between the first bending direction S1 and the first direction D1 may also be approximately 45 degrees, as shown in FIGS. 2A to 2C, or the angle θ1 between the first bending direction S1 and the first direction D1 may also be approximately 90 degrees, as shown in FIGS. 3A to 3C. Namely, as previously defined, the first direction D1 may be away from the dummy line ML and the first bending direction S1 may be parallel to or toward the dummy line ML. Also, in this embodiment, the angles θ1, θ2, θ3, and θ4 between the branches and the defined directions are described to be the same, for example. However, the invention is not limited thereto. In other words, the angles between the branches and the defined directions may be adjusted based on practical needs. In another embodiment, the first direction D1 may direct toward the dummy line ML and the first bending direction S1 may be parallel to or away from the dummy line ML. For example, the configuration of the common electrode in the above embodiment may be applied to the pixel electrode, and the configuration of the pixel electrode may be applied to the common electrode. In this way, the pixel electrode with the above feature may be obtained. In other words, the spirit of the invention lies in that the first direction directs toward the dummy line, and the first bending direction is parallel to or away from the dummy line, or the first direction is away from the dummy line and the first bending direction is parallel to or direct toward the dummy line. In an embodiment (not shown), when the first and third branches are located at the lower part of the pixel region, the first end portion is bent upward from the first direction, the third end portion is bend downward from the third direction, the second and fourth branches are located at the upper part of the pixel region, the second end portion is bent downward from the second direction, and the fourth end portion is bent upward from the fourth direction.

It should be mentioned that even though the above embodiment describes that the pixel electrode has the configuration shown in FIGS. 1A to 3C, and the active device and the pixel electrode are connected as shown in FIGS. 1A to 3C, for example, the invention is not limited thereto. Thus, in other embodiments, it is not departed from the spirit of the invention as long as the first direction and the first bending direction respectively defined by the extension portion and the end portion of the first branch exhibit the specific relation, namely the first direction directing toward the dummy line and the bending direction being parallel to or away from the dummy line, or the first direction being away from the dummy line and the first bending direction being parallel to or toward the dummy line. The invention does not limit the configuration of the pixel electrode or the connection or configurations of other components. Besides, based on the practical needs, the angles between the end portions of the branches and the defined directions, the lengths of the end portions, and pitches between the end portions may be adjusted.

Figure 4:
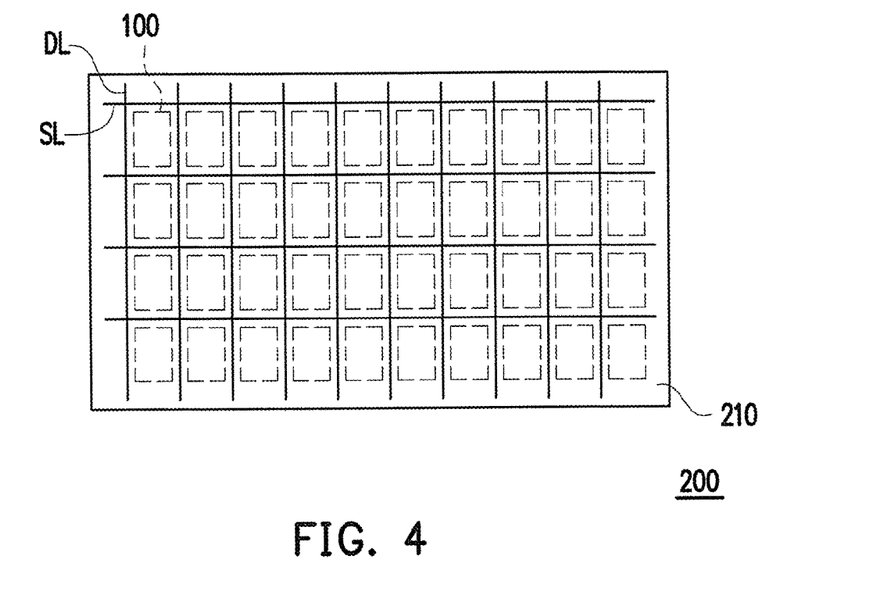
FIG. 4 is a schematic top view illustrating a pixel array layer according to an embodiment of the invention.

FIG. 4 is a schematic top view illustrating a pixel array layer according to an embodiment of the invention. Referring to FIG. 4, a pixel array layer 210 includes a plurality of the pixel structures 100 disposed on a substrate 200 and arranged as an array. Details of the pixel structure 100 may be referred to the description in the above embodiments and are thus not reiterated below. The pixel array layer 210 may be an in-plane switching pixel array layer.

Figure 5:
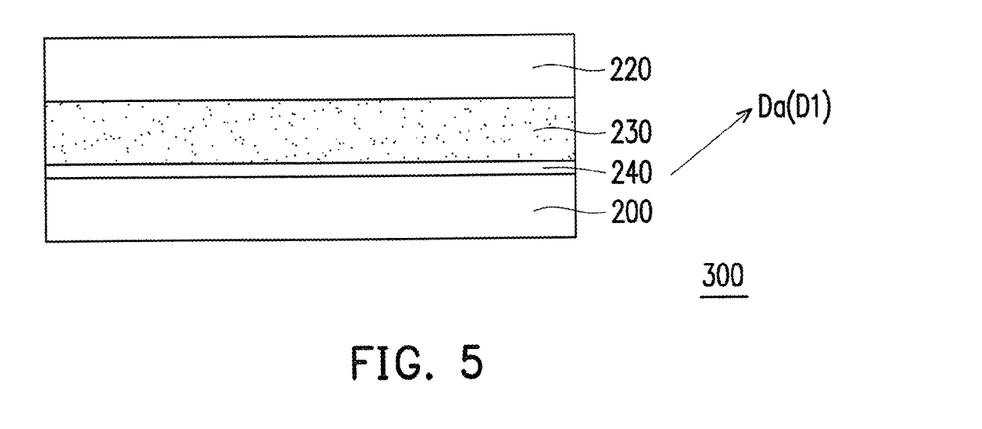
FIG. 5 is a schematic cross-sectional view illustrating a liquid crystal display according to an embodiment of the invention.

FIG. 5 is a schematic cross-sectional view illustrating a liquid crystal display according to an embodiment of the invention. Referring to FIG. 5, a liquid crystal display 300 includes the pixel array layer 210 shown in FIG. 4, a color filter layer 220, a liquid crystal layer 230, and an alignment layer 240. The pixel array layer 210 includes a plurality of the pixel structures 100 disposed on the substrate 200. The liquid crystal layer 230 is disposed between the pixel array layer 210 and the color filter layer 220. The alignment layer 240 is disposed between the pixel array layer 210 and the liquid crystal layer 230 and has an alignment direction Da. In addition, the first direction D1 described in the previous embodiment is substantially not parallel to the alignment direction Da. Namely, there is an included angle between the first direction D1 and the alignment direction Da. In this embodiment, the liquid crystal display 300 is an in-plane switching display, for example. Of course, the liquid crystal display 300 shown in FIG. 5 is described in this embodiment as an example. In other embodiments, the liquid crystal display 300 may also have other configurations well known in this field. Thus, details in this respect will not be reiterated in the following.

In the above embodiments, the branches of the pixel electrode are designed to have the terminal ends that are bent, such that the directions respectively defined with the end portions and the extension portions of the branches are related to the dummy line in a specific way. In this way, disclination lines may be reduced, and a liquid crystal efficiency is increased. Thus, the liquid crystal display using the pixel structure has a preferable transmittance and display quality.

Figure 6A:
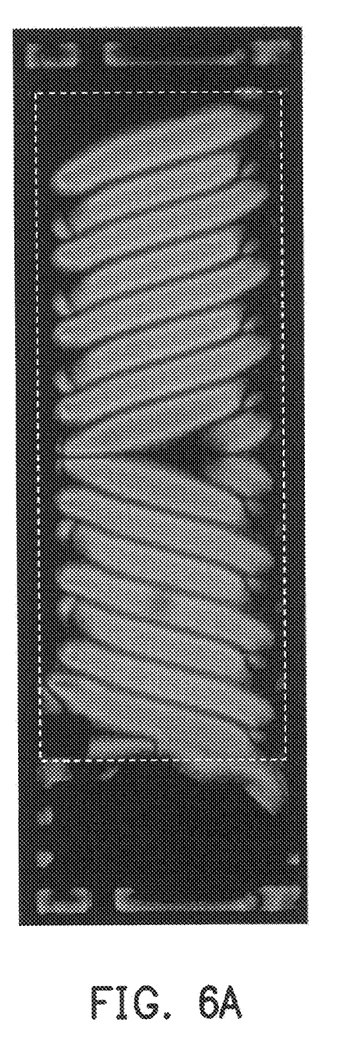
FIGS. 6A and 6B are views respectively illustrating image analysis results of pixel structures of comparative and experimental examples, wherein frames marked with broken lines indicate areas where the image analysis is conducted.
Figure 6B:
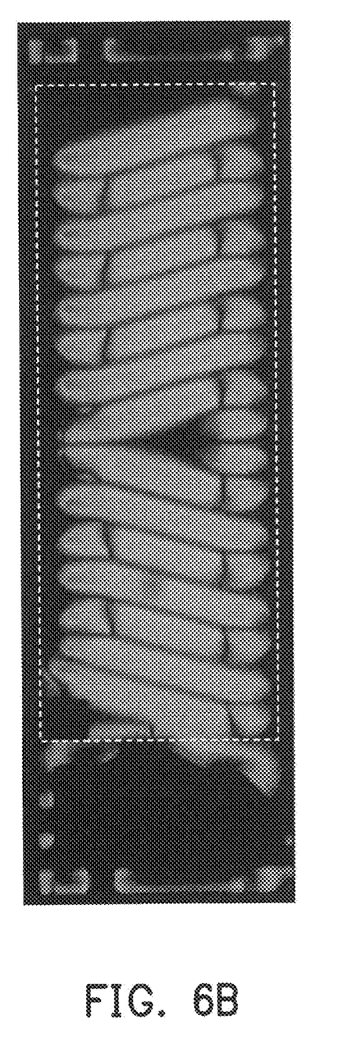
Figure 6C:
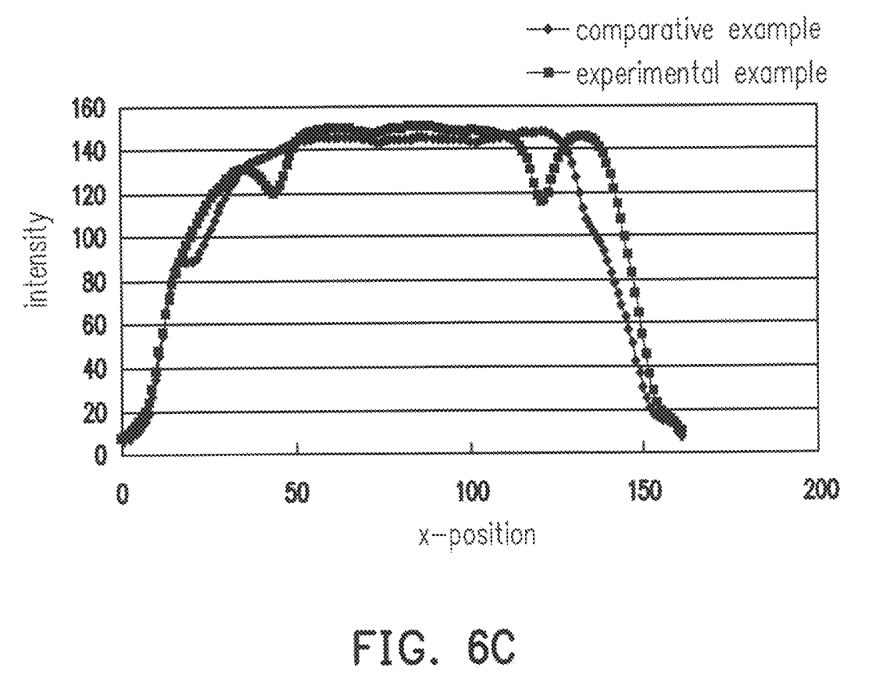
FIG. 6C is a view illustrating a relation between image intensities and positions of the pixel structures of the comparative and experimental examples.

In the following, an experimental example and a comparative example are provided to demonstrate that the liquid crystal display using the pixel structure of the invention has a preferable liquid crystal efficiency. FIGS. 6A and 6B are views respectively illustrating image analysis results of pixel structures of comparative and experimental examples, wherein frames marked with broken lines indicate areas where the image analysis is conducted. FIG. 6C is a view illustrating a relation between image intensities and positions of the pixel structures of the comparative and experimental examples. The pixel structure of the experimental example has the structure shown in FIG. 1A. In addition, the first direction of the first branch is away from the dummy line, and the first bending direction is parallel to the dummy line. The pixel structure of the comparative example is approximately the same as the structure shown in FIG. 1A, but mainly differs in that the first direction of the first branch is away from the dummy line and the first bending direction is also away from the dummy line. Referring to FIGS. 6A to 6C together, after calculation, an average image intensity of the comparative example is 111.53, and an average image intensity of the experimental example is 116.79. In other words, compared with the conventional pixel structure, the liquid crystal efficiency of the pixel structure of the invention increases by 4.7%.

In view of the foregoing, in the pixel structure of the invention, the directions respectively defined with the end portions and the extension portions of the branches are related to the dummy line in a specific way, so as to reduce disclination lines. In this way, the liquid crystal efficiency may be increased, such that the liquid crystal display using the pixel structure has a preferable transmittance and display quality. Also, since the pixel structure and the liquid crystal display including the pixel structure of the invention require substantially the same manufacturing procedures as the conventional pixel structure and the liquid crystal display, the manufacturing cost of the pixel structure and the liquid crystal display including the pixel structure of the invention do not substantially increase, and a yield rate and performance of the pixel structure and the liquid crystal display can be increased significantly. Moreover, the invention is suitable for a large-sized liquid crystal display, such as in-plane switching display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure disposed in a pixel region divided up by a dummy line, comprising:
   an active device; and
   a pixel electrode, electrically connected to the active device and comprising a plurality of first branches, a plurality of second branches and a first trunk, wherein the first branches and the second branches are respectively located at opposite sides with respect to the dummy line and disposed symmetrically with respect to the dummy line, at least one of the first branches has a first extension portion and a first end portion, a directed line segment from a first front end toward a first terminal end of the first extension portion is a first directed line segment, the first terminal end of the first extension portion is connected to a second front end of the first end portion, a directed line segment from the second front end to a second terminal end of the first end portion is a first bending directed line segment, and the first trunk is located at a first side of the pixel region adjacent to a data line, wherein the first front end of the first extension portion is physically connected to the first trunk, the first end portion is a portion of the first branch farthest from the first trunk, the second terminal end of the first end portion is a free end, and
   the first directed line segment is toward the dummy line and the first bending directed line segment is parallel to or away from the dummy line, or the first directed line segment is away from the dummy line and the first bending directed line segment is parallel to or toward the dummy line.

2. The pixel structure as claimed in claim 1, wherein the dummy line is a horizontal line, and the dummy line divides the pixel region into an upper part and a lower part.

3. The pixel structure as claimed in claim 2, wherein at least one of the second branches has a second extension portion and a second end portion, a directed line segment from a third front end toward a third terminal end of the second extension portion is a second directed line segment, the terminal portion of the second extension portion is connected to a fourth front end of the second end portion, a directed line segment from the fourth front end toward a fourth terminal end of the second end portion is a second bending directed line segment, and the at least one second branch and the at least one first branch are disposed symmetrically with respect to the dummy line.

4. The pixel structure as claimed in claim 3, wherein the first front end of the first extension portion is physically connected to the first trunk through a first connection point, and the first extension portion extends to the first terminal end from the first connection point without being bent.

5. The pixel structure as claimed in claim 4, wherein the third front end of the second extension portion is physically connected to the first trunk through a second connection point, and the second extension portion extends to the third terminal end from the second connection point without being bent.

6. The pixel structure as claimed in claim 4, wherein a portion where the first front end of the first extension portion and the first trunk are physically connected is substantially in a triangular shape.

7. The pixel structure as claimed in claim 3, further comprising a common electrode, wherein the common electrode comprises a plurality of third branches and a plurality of fourth branches, the third branches and the first branches are located at the same side with respect to the dummy line and are disposed alternately, and the fourth branches and the second branches are located at the same side with respect to the dummy line and are disposed alternately.

8. The pixel structure as claimed in claim 7, wherein at least one of the third branches has a third extension portion and a third end portion, a directed line segment from a fifth front end toward a fifth terminal end of the third extension portion is a third directed line segment, the fifth terminal end of the third extension portion is connected to a sixth front end of the third end portion, a directed line segment from the sixth front end toward a sixth terminal end of the third end portion is a third bending directed line segment, and the third directed line segment is parallel and opposite to the first directed line segment, and the third bending directed line segment is parallel and opposite to the first bending directed line segment.

9. The pixel structure as claimed in claim 8, wherein the first branches and the third branches are located at the upper part of the pixel region, the first end portion is bent downward from the first directed line segment, the third end portion is bent upward from the third directed line segment, or the first branches and the third branches are located at the lower part of the pixel region, the first end portion is bent upward from the first directed line segment, and the third end portion is bent downward from the third directed line segment.

10. The pixel structure as claimed in claim 8, wherein at least one of the fourth branches has a fourth extension portion and a fourth end portion, a directed line segment from a seventh front end toward a seventh terminal end of the fourth extension portion is a fourth directed line segment, the seventh terminal end of the fourth extension portion is connected to an eighth front end of the fourth end portion, a directed line segment from the eighth front end toward an eighth terminal end of the fourth end portion is a fourth bending directed line segment, the fourth directed line segment is parallel and opposite to the second directed line segment, and the fourth bending directed line segment is parallel and opposite to the second bending directed line segment.

11. The pixel structure as claimed in claim 10, wherein the second branches and the fourth branches are located at the lower part of the pixel region, the second end portion is bent upward from the second directed line segment, and the fourth end portion is bent downward from the fourth directed line segment, or the second branches and the fourth branches are located at the upper part of the pixel region, the second end portion is bent downward from the second directed line segment, and the fourth end portion is bent upward from the fourth directed line segment.

12. The pixel structure as claimed in claim 10, wherein the common electrode comprises a second trunk located at a second side of the pixel region, the fifth front end of the third extension portion is physically connected to the second trunk through a third connection point, the third extension portion extends to the fifth terminal end from the third connection point without being bent, and the first side and the second side are opposite sides.

13. The pixel structure as claimed in claim 12, wherein the seventh front end of the fourth extension portion is physically connected to the second trunk through a fourth connection point, and the fourth extension portion extends to the eighth terminal end from the fourth connection point without being bent.

14. A liquid crystal display, comprising:
 a pixel array layer, comprising a plurality of pixel structures, wherein each of the pixel structures is disposed in a pixel region, and the pixel region is divided up by a dummy line, the pixel structure comprising:
   an active device; and
   a pixel electrode, electrically connected to the active device and comprising a plurality of first branches, a plurality of second branches and a first trunk, wherein the first branches and the second branches are respectively located at opposite sides with respect to the dummy line and disposed symmetrically with respect to the dummy line, at least one of the first branches has a first extension portion and a first end portion, a directed line segment from a first front end toward a first terminal end of the first extension portion is a first directed line segment, the first terminal end of the first extension portion is connected to a second front end of the first end portion, a directed line segment from the second front end to a second terminal end of the first end portion is a first bending directed line segment, and the first trunk is located at a first side of the pixel region adjacent to a data line, wherein the first front end of the first extension portion is physically connected to the first trunk, the first end portion is a portion of the first branch farthest from the first trunk, the second terminal end of the first end portion is a free end, and the first directed line segment is toward the dummy line and the first bending directed line segment is parallel to or away from the dummy line, or the first directed line segment is away from the dummy line and the first bending directed line segment is parallel to or toward the dummy line;
 a color filter layer;
 a liquid crystal layer, disposed between the pixel array layer and the color filter layer; and
 an alignment layer, disposed between the pixel array layer and the liquid crystal layer and having an alignment direction, wherein the first directed line segment is not parallel to the alignment direction.

* * * * *